Patented Aug. 19, 1924.

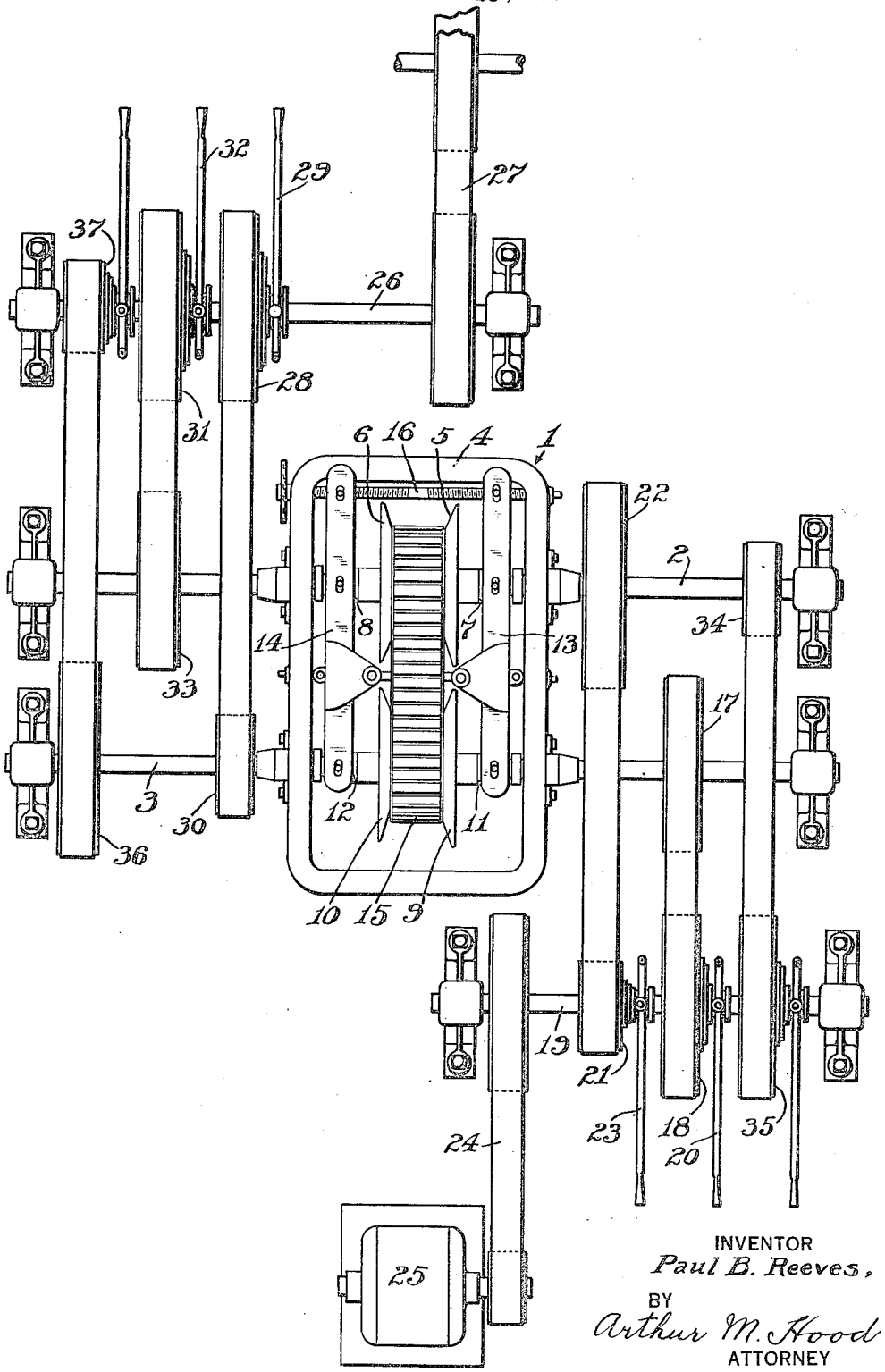

1,505,427

UNITED STATES PATENT OFFICE.

PAUL B. REEVES, OF COLUMBUS, INDIANA, ASSIGNOR TO REEVES PULLEY COMPANY, OF COLUMBUS, INDIANA, A CORPORATION OF INDIANA.

SPEED-VARYING TRANSMISSION.

Application filed June 26, 1922. Serial No. 571,081.

*To all whom it may concern:*

Be it known that I, PAUL B. REEVES, a citizen of the United States, residing at Columbus, in the county of Bartholomew and State of Indiana, have invented a new and useful Speed-Varying Transmission, of which the following is a specification.

My invention relates to improvements in speed changing apparatus and has for one of its objects the provision of means whereby a greater range of speed variations may be obtained with a single speed changing transmission than is ordinarily obtained by such transmission.

For the purpose of disclosing my invention, I have illustrated one embodiment thereof in the accompanying drawing in which the figure is a plan view, more or less diagrammatic, of an apparatus embodying my invention.

In the structure illustrated, I provide a variable speed transmission 1 which may consist of two parallel shafts 2 and 3 suitably journaled in a supporting frame 4. Splined on the shaft 2 is a pair of cone disks 5 and 6 having their cone surfaces facing each other. These disks are provided with projecting hubs which bear against thrust collars 7 and 8. A similar pair of disks 9 and 10 are splined on the shaft 3 and have their hubs bearing against thrust collars 11 and 12. The corresponding collars of each pair of disks are engaged by levers 13 and 14 pivoted to the frame 4 intermediate of the shafts 2 and 3 and adapted to oscillate on said pivots to move one pair of disks toward each other and simultaneously therewith move the other pair apart.

A bevelled edge drive belt 15 extends between the pairs of disks and as the disks of one pair move together the belt assumes a greater driving diameter, while the disks of the other pair move apart and the belt assumes a smaller driving diameter, thus varying the speed of one shaft relatively to the other.

The levers 13 and 14 are operated by a threaded screw 16 oppositely screw threaded on opposite sides of its center and operating in suitable nuts connected to the ends of the levers.

Mounted on shaft 3 at one side of the frame is a pulley 17 belted to a clutch pulley 18 on a countershaft 19, an operating lever 20 being provided for operating the clutch pulley.

A second clutch pulley 21 is mounted on the shaft 19 which pulley is connected by a belt with a pulley 22 on the shaft 2 and is operated by a suitable lever 23. The shaft 19 is the driving countershaft and is connected by means of a belt 24 with a prime mover such for instance as an electric motor 25. A second countershaft 26 is provided, which is connected by a belt 27 with a driven mechanism. This shaft 26 is provided with a clutch pulley 28 operated by lever 29 and belted to a pulley 30 on the shaft 3; and a second clutch pulley 31 operated by a lever 32 and belted to a pulley 33 on the shaft 2.

In addition to the above described pulley connections I provide on the shaft 2 an additional pulley 34 and on the shaft 19 an additional clutch pulley 35, likewise on the shaft 3 I provide a pulley 36 and an additional clutch pulley 37 on the shaft 26 whereby a wide range of speed variation will be obtained.

While various sized pulleys may be used and different speed transmissions may be used, for the purpose of illustration the structure shown may be arranged to give a speed ratio of 64 to 1 and with the shaft 19 being driven at a constant speed of 200 R. P. M. the shaft 26 may be operated at speeds varying from 25 R. P. M. to 1600 R. P. M. To obtain these results in one form of the invention the pulleys 17, 18, 22, 31, 33, 36 and 28 are 24 inches in diameter and the pulleys 19, 30, 34 and 37 are 12 inches in diameter while the speed varying transmission 1 will give a transmission ratio of 2 to 1 above or below normal. Under these circumstances in operation, with the shaft 19 rotating at 200 R. P. M. and the clutch pulley 21 connected to the shaft 19 the clutch pulleys 18 and 35 being disconnected, the shaft 2 will be driven at 100 R. P. M. The speed changing transmission being set for delivering the minimum speed to the shaft 3, the shaft 3 will be operated at 50 R. P. M. and with the clutch pulley 28 connected and the clutch pulleys 31 and 37 disconnected the shaft 26 will be rotated at 25 R. P. M. By manipulating the disks 5 and 6 and the disks 9 and 10 to cause the disks 5 and 6 to approach one another and the disks 9 and 10 to separate, the driven speed of the shaft 3 will be gradually accelerated until with the disks 5 and 6 separated the same distance as the disks 9 and 10, the shafts 2 and 3 will be operated at the same speed, namely 100 R. P. M. A continued operation of the two pairs of disks will cause the disks 5 and 6 to approach to the maximum and the disks 9 and 10 to separate to their maximum whereby the maximum transmission speed of the transmission mechanism will operate the shaft 3 at 200 R. P. M. and the shaft 26 will be driven at 100 R. P. M. Under these circumstances the shaft 3 is being rotated at the same speed as the shaft 19 and as pulleys 17 and 18 are of the same size, clutch pulley 18 may be connected to the shaft 19 and clutch pulley 21 disconnected from the shaft 19 so that shaft 3 is driven directly from the shaft 19 and shaft 2 driven through the speed changing mechanism and thereby becoming the driven shaft. With this arrangement, as has been described, the disks 5 and 6 have been moved toward one another to their maximum and 9 and 10 separated to their minimum so that shaft 2 is being driven at 100 R. P. M. As pulleys 33 and 31 are of the same size, clutch pulley 31 may now be connected with the shaft 26 and the clutch pulley 28 disconnected leaving the shaft 26 rotated at 100 R. P. M. The operation now of the speed changing transmission may be reversed and the disks 5 and 6 caused to separate and the disks 9 and 10 caused to approach, gradually increasing the speed of the shaft 2 from 100 R. P. M. to 400 R. P. M., and the shaft 26 will be driven at the same speed. Shaft 2 is now being driven at 400 R. P. M. and due to the fact that pulley 34 is one half the size of pulley 35 the clutch pulley 35 may be thrown into engagement to connect the pulley with shaft 19 and clutch pulley 18 disconnected, the shaft 2 being still driven at 400 R. P. M. Under these circumstances the shaft 3 becomes now the driven shaft and is being driven through the speed changing transmission at 200 R. P. M.

Due to the fact that clutch pulley 37 is half the size of clutch pulley 36, pulley 37 may be connected to the shaft 26 and clutch pulley 31 disconnected so that shaft 3 will be driving shaft 26 at 400 R. P. M.

The operation of the speed changing transmission now may again be reversed and by causing disks 5 and 6 to approach one another to the maximum and disks 9 and 10 to separate from one another to their maximum, the speed of shaft 3 will be increased to 800 R. P. M. and the speed of shaft 26 accordingly increased to 1600 R. P. M.

It is thus seen that by alternatively causing the shafts 3 and 2 to become respectively driving and driven members and connecting these shafts to the driving and driven shafts, the speed changing gear may be manipulated so that with a single speed changing gear an extremely wide range of speed variation may be obtained.

Explaining the manipulation of the speed changing mechanism more fully, it will be observed that when the shaft 26 is being driven at its minimum speed from the shaft 19, this shaft 26 is rotating at only one eighth the speed of the shaft 19. This is due to the fact that the shaft 19 is driving the shaft 2 at only one half its speed because of the relative sizes of the pulleys extending between the shafts. Shaft 2 is driving shaft 3 through the speed changing mechanism at one half the speed of shaft 2 and shaft 3, due to the relative sizes of the pulleys, is driving shaft 26 at only one half the speed of shaft 3, thereby making shaft 2 operate at only one eighth the speed of shaft 19. By manipulating the speed changing gearing, the speed of shaft 3 may be brought up to the same speed as shaft 19 thus bringing the shaft 26 up to one half the speed of shaft 19. Under these circumstances, with shaft 3 being driven at the same speed as shaft 19, it may be connected through the pulley and belt mechanism directly to shaft 19 and the drive to shaft 26 will be from shaft 19 to shaft 3 and thence to 26, shaft 26 still, however, operating at one half the speed of shaft 19 and shaft 2, instead of being the driving shaft is now the driven shaft of the speed changing gear. If shaft 2 now is connected to shaft 26 by pulleys which will not change their relative speed, shaft 3 may be disconnected from the shaft 26 and shaft 26 still be driven at one half the speed of shaft 19. We now have the shaft 26 driven from shaft 19 through the speed changing mechanism, shaft 3 being the driving shaft of the speed changing mechanism and shaft 2 the driven mechanism and connected to shaft 26. The speed changing mechanism may now be manipulated to again raise the speed of shaft 26 until shaft 26 is being driven at twice the speed of shaft 19, shaft 2 being driven at a similar speed. If shaft 2 now be connected with shaft 19 by pulleys with a two to one ratio, the relative speed between shaft 2 and shaft 19 will be still maintained but the drive to shaft 26 will be from shaft 19 directly to shaft 2 and thence to shaft 26, thereby eliminating the speed changing mechanism, or in other words, changing shaft 2 to the driving shaft and shaft 3 to the driven shaft. Now if shaft 3 be connected to shaft 26 by a pulley connection of a two to one ratio, shaft 2 may be disconnected from the shaft 26 and shaft 26 still be driven at its increased speed. The speed changing mechanism now may again be manipulated so as to increase the speed of shaft 3 which in turn will increase the corresponding speed of shaft 26. It is therefore obvious that by this back and forth connection between the shafts 2 and 3 of the speed changing mechanism, a large increase of speed of the shaft 26 from the minimum to the maximum may be obtained with a single speed changing gear.

It is obvious that a reversal of the above operation will reduce the speed of shaft 26 in the same manner.

I claim as my invention:

1. The combination of a speed varying mechanism comprising two power elements and intermediate cooperating mechanism by which the speed relationship of said elements may be varied, a primary driver member and a primary driven member, means by which the power elements may be connected to the primary driver at different speed relations, and means by which the power elements may be connected to the primary driven member at different speed relations.

2. The combination with a driving shaft and a driven shaft, of a speed changing transmission having a pair of power shafts and means for alternately connecting the power shafts of said transmission to said driving and driven shafts.

3. The combination with a driving shaft and a driven shaft, of a speed changing transmission having a pair of power shafts, means for operating said power shafts from said driven shaft at different speeds, and means for connecting said driven shaft with each of the power shafts of the transmission.

4. The combination with a driving shaft and a driven shaft, of a speed changing transmission having a pair of power shafts, means for alternately operating said power shafts from the driven shaft as the driven shaft of the transmission, and means for alternately connecting said power shafts with the driven shaft.

5. The combination with a driving shaft and a driven shaft, of a speed changing transmission including a pair of power shafts, means for alternately operating one power shaft as the driven shaft, and the other as the driving shaft respectively of said transmission, and for connecting the driving shaft of the transmission to the driving shaft and connecting the driven shaft of the transmission to the driven shaft.

6. The combination with a driving shaft and a driven shaft, of a speed changing transmission having a pair of power shafts, means for connecting each of said power shafts to the driving shaft and means for connecting each of said power shafts with said driven shaft.

7. The combination with a driving shaft and a driven shaft of a speed changing transmission having a pair of power shafts, means for driving each of said power shafts at different speeds by said driven shaft and means for connecting each of said power shafts to the driven shaft.

8. The combination with a driving shaft and a driven shaft, of a speed changing transmission having a pair of power shafts, means for driving one of said shafts from the driving shaft and for connecting the second shaft with the driven shaft, means for operating said transmission to increase the speed of the second power shaft, means for driving said second power shaft direct from the driving shaft in synchronism with its increased speed, means for disconnecting said second power shaft from the driven shaft and means for connecting said first power shaft with the driven shaft.

9. The combination with a driving shaft and a driven shaft, of a speed changing transmission including a pair of power shafts each having connected thereto a pair of cone discs having their cone surfaces facing one another, a belt extending between the pairs of discs, means for operating the discs of each pair to cause them to diverge and approach, means for operating each of said power shafts at different speeds direct from the driving shaft, and means for connecting each of said power shafts to said driven shaft.

In witness whereof I, PAUL B. REEVES, have hereunto set my hand at Columbus, Indiana, this 13th day of June, A. D. one thousand nine hundred and twenty two.

PAUL B. REEVES.